UNITED STATES PATENT OFFICE.

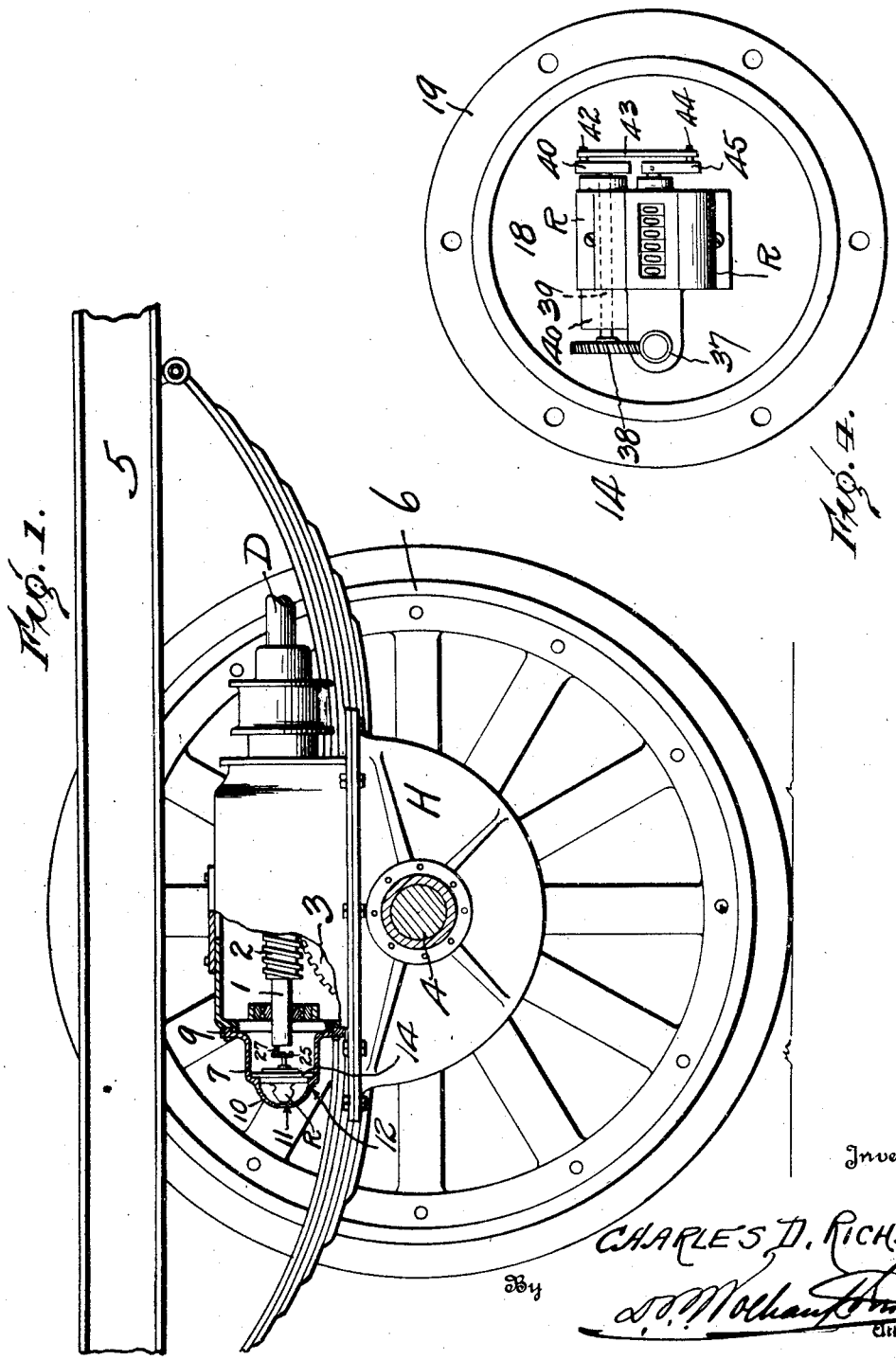

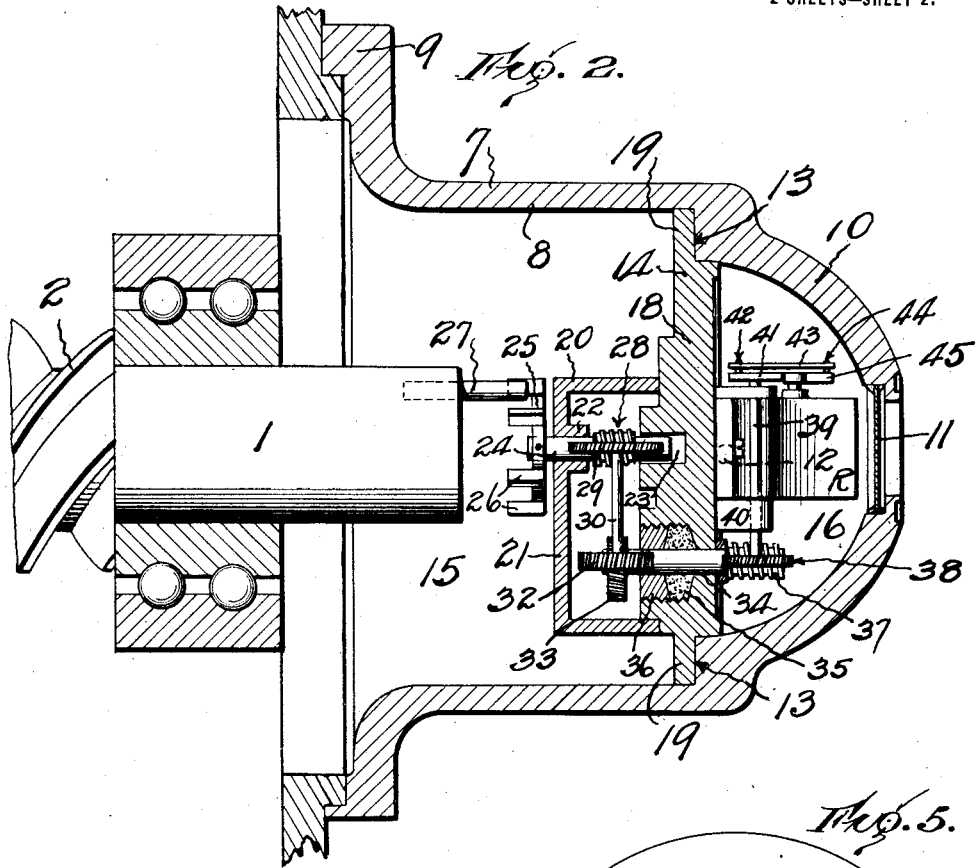

CHARLES DONAT RICHARD, OF NEW YORK, N. Y.

CHASSIS-ODOMETER.

1,357,422.   Specification of Letters Patent.   Patented Nov. 2, 1920.

Application filed June 6, 1917. Serial No. 173,175.

*To all whom it may concern:*

Be it known that I, CHARLES D. RICHARD, a citizen of the Republic of France, residing at New York, in the county of New York and State of New York, have invented certain new and useful Improvements in Chassis-Odometers, of which the following is a specification.

This invention relates to the subject of mileage registers or odometers, and has particularly in view a device of this character constructed with special reference to a new and desirable mounting thereof on the chassis of an automobile truck or equivalent vehicle, to thereby obtain certain advantages and to thereby overcome many disadvantages in the use of the ordinary so-called odometers.

Hub-odometers, that is, mileage registers which are carried on the hub of the wheel of a motor vehicle, especially trucks or commercial vehicles have been, and are, extensively employed, but are open to numerous objections. Among the more important objections to the ordinary hub-odometers is the fact that the location thereof on the outside of the hub of the wheel creates a dangerous and unsafe condition, as well as subjecting the registering mechanism to conditions which easily disarrange and damage the same. In this connection, it is well understood that hub odometers are usually arranged within a hub cap or casing fitted to the outside of the hub of the front vehicle wheel, and have a materially greater projection beyond the wheel than the ordinary hub cap. This is a very serious feature on trucks employed in crowded thoroughfares, and subject to traffic conditions where unusual projections of this character result in many accidents. Furthermore, the location of an odometer or mileage register in this position on the front wheel of a vehicle subjects the same to violent shocks and jars incident to the wheel passing over obstructions and dropping into ruts, and also has the disadvantage of the device being always exposed to easy breakage by coming in contact with obstructions.

Furthermore, a disadvantage in the use of an ordinary hub-odometer on the front wheel of a vehicle is that the casing or housing of the device must of necessity rotate with the wheel, and in most instances the counter device or register proper within the casing also rotates with the result of making the readings of the instrument awkward and unsatisfactory.

Therefore, a principal object of the present invention is to provide for a novel mounting of the odometer or mileage register, in such a manner upon the chassis of a motor or equivalent vehicle as to entirely obviate the objections above mentioned to the use of a mileage register or odometer, on the outside of the hub of the front wheel of the vehicle. At the same time, the improvement provides for so mounting the odometer as to reduce to a minimum the malicious destruction of the instrument by the driver or others, and furthermore, to be able to utilize to the best possible advantage the drive gearing of the vehicle itself as a means for communicating a steady and reliable motion to the register parts so as to insure a greater degree of accuracy than is possible by relying upon the motion of the constantly jarred wheel of the vehicle as is the case with the hub-odometer.

As a general object the invention, therefore, has in view, a permanent and stationary mounting of the odometer with all of the parts so arranged and organized as to preserve rigidity and stability of the mounting, while at the same time relying on the smooth and uniform motion of the drive gearing of the vehicle for actuation.

A further and more specific object is to provide a construction possessing special utility in its adaptation to a worm gear driving motor truck, so that the housing for the worm gear drive may be utilized as the main base or support upon which the housing for the device and its mechanism is carried.

With the above and other objects in view which will more readily appear as the nature of the invention is better understood, the same consists in the novel construction, combination and arrangement of parts hereinafter more fully described, illustrated and claimed.

This invention is necessarily susceptible of structural modification without departing from the spirit or scope of the same, but a preferred and practical embodiment thereof is shown in the drawings, in which—

Figure 1 is a detail view of the rear end of a truck chassis showing the differential casing, and the location of the present invention.

Fig. 2 is an enlarged horizontal sectional view showing the rear end of the worm drive of the vehicle and the operating connections for the register or counter.

Fig. 3 is a side elevation of the register operating mechanism.

Fig. 4 is an elevation of the base or carrier plate, also showing the register or counter, and its operating mechanism.

Fig. 5 is a rear elevation of the stationary base or carrier plate with the cover for the register mechanism in dotted lines to show more clearly the instrumentalities which connect the register operating mechanism with the worm drive-shaft.

Similar reference characters designate corresponding parts throughout the several figures of the drawings.

In carrying out the invention, it is preferable to utilize as a permanent base or support for the instrument, the housing H for the worm gear drive D of a motor truck, which renders it possible to secure all of the desirable advantages referred to, and at the same time to derive motion directly from the worm drive-shaft of the machine. Thus, a chassis mounting is provided for the odometer having the numerous advantages indicated, which will more fully appear as the description of the invention proceeds.

Referring more particularly to the application of the invention illustrated in the accompanying drawings, it will be observed that in the preferable type of vehicle to which the device is applied, the worm gear drive casing or housing H occupies the usual position of the ordinary "differential casing" on a motor vehicle, and the same accommodates therein the worm drive-shaft 1, carrying the driven worm 2 in mesh with the worm gear wheel 3 mounted on the rear axle 4 carried within the chassis frame 5, and supporting the usual traction or driving wheels 6. This worm gear casing is provided within the longitudinal plane of the drive shaft 1 with the usual inspection or access opening, for repairing or oiling, and according to the present invention it is proposed to utilize as the cover for this opening, the stationary housing casing 7, which will also act as the cap or cover for the opening, as well as providing a chamber for accommodating the register or counter mechanism.

As will be observed from Fig. 2 of the drawings, this housing casing 7 is preferably a single casting including a body portion 8 having at its open end an angularly disposed attaching flange 9 adapted to be secured to the stationary worm drive housing H, while the opposite end of the body is formed with a substantially semi-spherical closed end portion 10 having therein a centrally located inspection or register reading window 11, and a radially disposed oil draining opening or vent 12.

At the junction of the body portion 8 and the semi-spherical closed end portion 10, the casing 7 is provided with an interior abutment shoulder 13, to which is rigidly fitted a stationary base or carrier plate 14. Thus, with the formation of the casing described and the base or carrier plate 14 in position, the casing is divided into an enlarged chamber 15 for receiving and accommodating the bearings for the end of the worm shaft 1, and a register housing chamber 16.

The said fixed base or carrier plate 14 carries therewith a register or counter and its entire operating mechanism, and when in position against the shoulder 13 divides the interior of the said casing element 7 into the said two well defined chambers or compartments 15 and 16, the latter being sealed by the plate and, therefore, protected from oil and grease within the chamber 15. However, to further provide against oil from any source accumulating in the register chamber 16, the vent or drain opening 12 is provided, and as will also hereinafter more fully appear, other means is also utilized to prevent oil and grease from the differential mechanism following the register operating means.

Referring now more particularly to the base or carrier plate 14 which is rigidly secured within the stationary housing element 7, it will be observed that the same includes a body portion 18, which is relatively thick as compared with the peripheral portion thereof which terminates in a relatively thin shoulder abutting flange 19, and as above indicated, one side of this stationary base plate carries the register or counter device designated generally as R. This device may be of any conventional or well-known type, and is rigidly carried by the body portion 18 of the stationary base plate to be permanently positioned before the inspection or register reading window 11 in the closed end of the casing where it may be conveniently read at all times, since the register and casing do not rotate as in some hub-odometers.

The rear face of the carrier or base plate 14 has fitted thereto a register operating mechanism cover or cap, designated generally as 20, and provided in its main wall 21 with an inwardly projecting bearing sleeve 22 which coöperates with a socket 23 in the body 18 of the carrier plate 14 to provide suitable bearings for a main operating shaft 24. This main operating shaft carries at one end thereof a coupling claw 25, which, as shown, may consist of a circular disk-like body having a plurality of abutment projections 26, any one of which is adapted to engage with a pin 27 rigidly carried by the end of the worm drive-shaft 1. This type of claw is particularly advantageous since it facilitates the engagement of the pin 27 with the operating means for the register regardless of the position thereof when the casing 7 and all of its associated parts are fitted over the opening in the differential casing.

The intermediate portion of the main operating shaft 24 is provided with a driving worm 28, which meshes with a worm pinion 29 carried by a transmission shaft 30 journaled in suitable bearings 31 carried by the rear face of the body 18 of the stationary base 14. The said transmission shaft 30 having at one end thereof the said worm pinion 29, is fitted at its other end with another worm pinion 32, which in turn meshes with a worm pinion 33 carried by an intermediate motion transmitting shaft 34 journaled in the body 18 of the stationary base 14 at right angles to the transmission shaft 30. In connection with this shaft 34, it may be noted that the same is the only shaft which penetrates the base plate 14, and therefore, affords the only chance for oil and grease that may have worked into the chamber provided by the cover plate 20, to work into the register housing chamber 14. Therefore, to check any tendency of oil or grease to follow the intermediate motion transmitting shaft 34, the body 18 of the fixed base plate is provided with a threaded packing cavity 35, which is adapted to receive a suitable fiber or equivalent packing, which may be held in place by means of a threaded cap 36, as will be observed from Fig. 2 of the drawings.

The end of the motion transmitting shaft 34 opposite the pinion 33 is provided with a worm 37, which meshes with a worm pinion 38 carried upon a register operating shaft 39 journaled in suitable bearings 40 projecting from the front face of the body 18 of the stationary base plate and located directly above the register or counter device R. The end of the register operating shaft 39 opposite the pinion 38 rigidly carries a disk 41 having thereon a wrist pin 42, which is connected by means of a link 43 with a stud 44 on the rocking or reciprocating operating arm 45 of the register or counter device R.

Referring now to the manner of operation of the gearing for actuating the register or counter R, it will be observed from the several figures of the drawings that the steady rotary movement of the worm drive shaft 1 of the motor vehicle will impart a steady rotary movement to the coupling claw 25, by the engagement of the pin 27 on the worm drive shaft with one of the projections of the claw. Since the coupling claw 25 is rigidly carried by the main operating shaft 24, the movement of the worm drive shaft 1 will therefore be transmitted to the main operating shaft 24, and the latter through its worm 28 will give motion to the transmission shaft 30 through the worm pinion 29, and said transmission shaft will in turn operate the intermediate motion transmission shaft 34 through the intermeshing pinions 32 and 33. The rotation of the intermediate motion transmission shaft 34 will turn the register operating shaft 39 through the intermeshing worm 37 and worm pinion 38, whereby said shaft 39 will cause the disk 41 to revolve and give the link 43 a reciprocating movement through the wrist pin 42. This reciprocating movement of the link 43 will impart a rocking movement to the arm 45 of the register, and thus operate the register or counter mechanism in the usual way.

From the foregoing, it will be apparent that the present invention provides a novel mounting for an odometer, which renders the operation of the odometer much more effective and accurate, since the register or counter itself has a fixed or stationary mounting on a stationary base or support, and all of the motion required to operate the register is taken from the moving part of the vehicle which has a steady and constant drive, and is not in any way affected by road conditions or other factors usually taken into consideration in connection with the odometer on the hub of a vehicle wheel. Furthermore, it will be apparent that the present construction and arrangement provides for locating the mechanism in a place where the driver of the machine can not conveniently maliciously destroy the register and make it appear that it was due to an accident, as is often the case where odometers are placed in an exposed position on the hub cap of the front vehicle wheel. The proper and accurate registering of a mileage register is an important factor in trucking operations, since it is the main effective check on the truck driver, and has many other practical advantages which it is thought will be clearly apparent without prolonged enumerations of the same.

Accordingly, without further description, it is thought that the many features and advantages of the present invention will be readily apparent, and it will, of course, be understood that various changes in the form, proportion and minor details of construction may be resorted to without departing from the spirit of the invention or scope of the appended claim:

I claim:

A register operating mechanism including in combination with a drive shaft, register and stationary base therefor, of a cover element carried by said base, and gearing for operating said register device including a main operating shaft having its ends respectively journaled in the cover element and stationary base and arranged coaxially with the driving shaft, an intermediate transmission shaft journaled in the base parallel with the main operating shaft, gearing connecting one end of said intermediate motion transmitting shaft with the main operating shaft, and gearing connected with the other end of said intermediate motion transmitting shaft for operating the register, and coupling means for operatively connecting the register operating mechanism with said driving shaft.

In testimony whereof I hereunto affix my signature in the presence of two witnesses.

CHARLES DONAT RICHARD.

Witnesses:
F. R. MacDonald,
Geo. F. Corbett.